United States Patent [19]

Wakatsuki et al.

[11] Patent Number: 5,065,003

[45] Date of Patent: Nov. 12, 1991

[54] PORTABLE DATA INPUT/TRANSMISSION APPARATUS

[75] Inventors: Yoshio Wakatsuki; Toshiharu Okuyama; Hajime Takeuchi; Giichiro Shimizu; Misao Shimizu, all of Tokyo, Japan

[73] Assignee: Nitto Kohki Co., Ltd., Tokyo, Japan

[21] Appl. No.: 491,856

[22] Filed: Mar. 12, 1990

[30] Foreign Application Priority Data

Mar. 20, 1989 [JP] Japan ................. 1-31620[U]

[51] Int. Cl.⁵ .............................................. G06K 7/10
[52] U.S. Cl. .................................... 235/472; 235/462; 235/375
[58] Field of Search ............... 235/462, 472, 375, 379, 235/380; 343/702, 767, 783–787, 900–903; 455/351

[56] References Cited

U.S. PATENT DOCUMENTS

| | | | |
|---|---|---|---|
| 2,388,567 | 11/1945 | Patterson | 455/351 |
| 3,736,591 | 5/1973 | Rennels et al. | 343/702 |
| 3,826,900 | 7/1974 | Moellering | 235/462 |
| 4,410,890 | 10/1983 | Davis et al. | 455/351 X |
| 4,418,277 | 11/1983 | Tremmel et al. | 235/472 |
| 4,621,189 | 11/1986 | Kumar et al. | 235/472 |
| 4,628,193 | 12/1986 | Blum | 235/375 |
| 4,801,786 | 1/1989 | Stobbe | 235/472 X |
| 4,857,716 | 8/1989 | Gombrich et al. | 235/462 |
| 4,920,352 | 4/1990 | Martensson et al. | 343/702 |
| 4,970,379 | 11/1990 | Danstrom | 235/472 X |

FOREIGN PATENT DOCUMENTS 63-257836 10/1988 Japan .
WO87/07106 11/1987 PCT Int'l Appl. .

Primary Examiner—Stuart S. Levy
Assistant Examiner—Steven M. duBois
Attorney, Agent, or Firm—Nixon & Vanderhye

[57] ABSTRACT

A casing of a portable data input/transmission apparatus has an end portion, the size of which is determined such that the end portion can be held by one hand. A pen-scanner type bar code reader for reading a bar code is attached to one end of the casing in the longitudinal direction. A keyboard for enabling at least numerical data to be input is attached near the other end of the casing in the longitudinal direction. A transmitter/receiver is stored within the casing, the transmitter/receiver being designed to output wirelessly to an external data processing apparatus code data read by the bar code reader and at least numerical data input from the keyboard. A pair of antenna-containing grooves are formed in a pair of facing side surfaces extending in the longitudinal direction of the casing, such that the grooves extend in the longitudinal direction of the casing to said other end of the casing. An antenna is provided such that it is freely inserted into and drawn from the antenna-containing grooves from the other end of the casing, the antenna being formed of a substantially U-shaped, electrically conductive elastic material and being fitted in the grooves by virtue of the elastic force of the antenna.

7 Claims, 10 Drawing Sheets

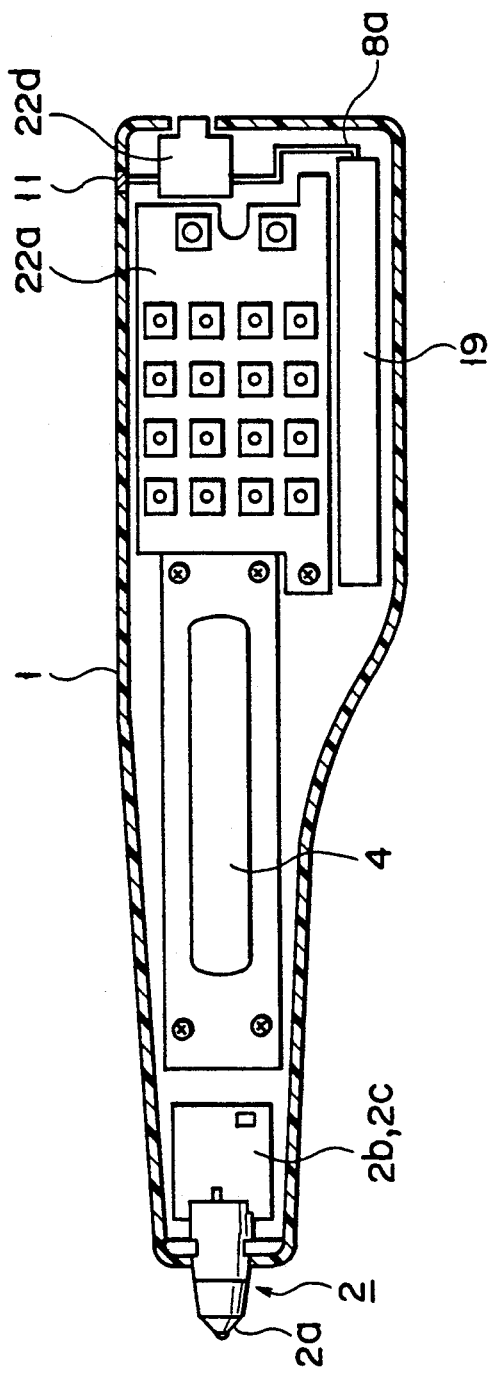
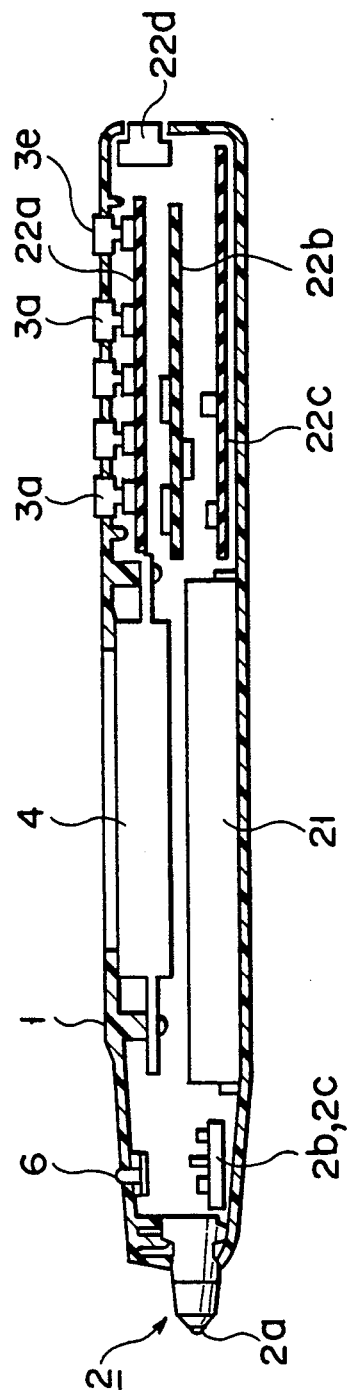
FIG. 5A
FIG. 5B

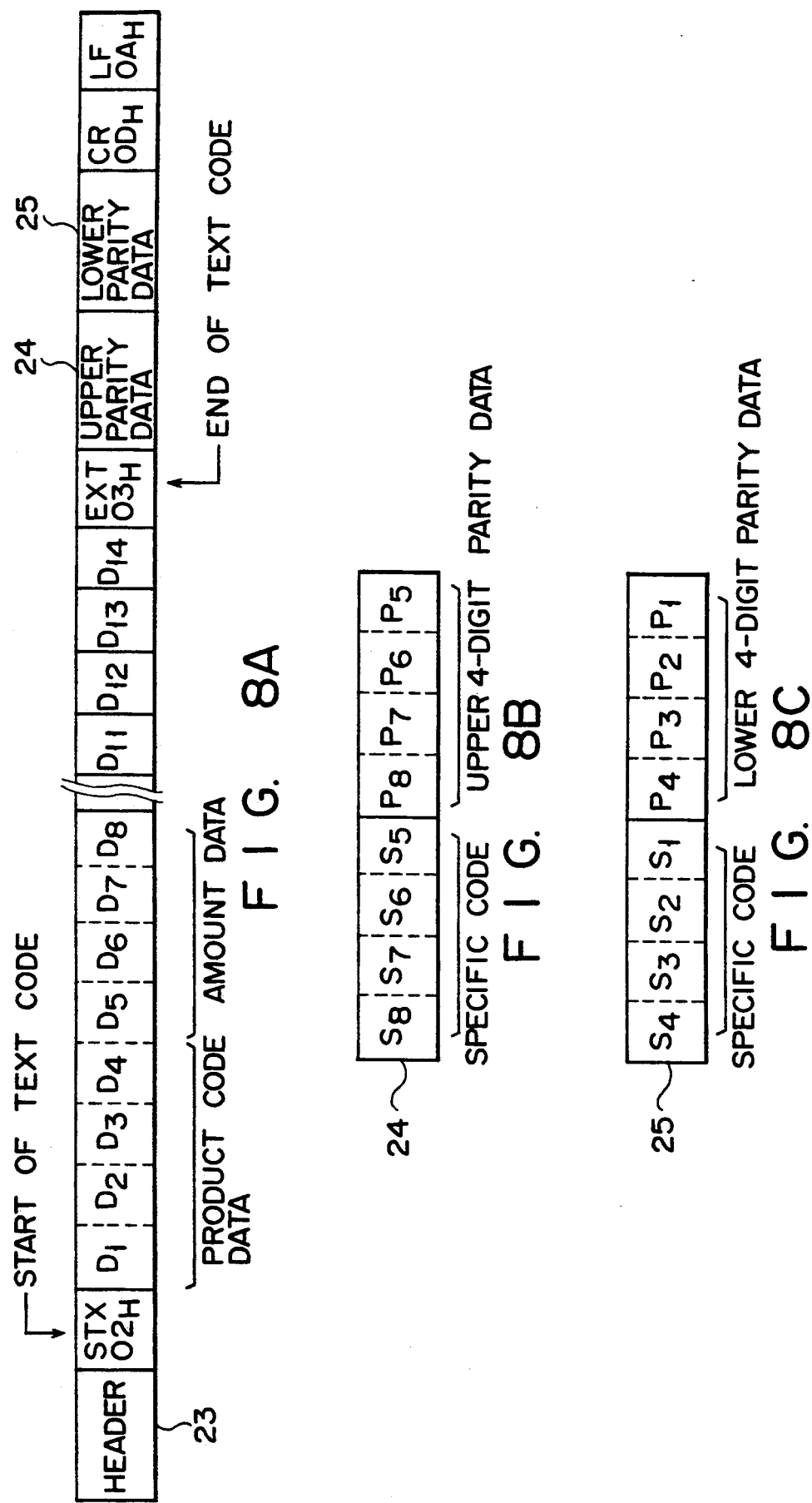

PORTABLE DATA INPUT/TRANSMISSION APPARATUS

BACKGROUND OF THE INVENTION

1. Field of the Invention

The present invention relates to a portable data input/transmission apparatus wherein data input by reading a bar code on an object and by means of key operations is stored, and the stored data is transmitted, for example, to an external data processing apparatus.

2. Description of the Related Art

In general, a portable data input apparatus is employed for higher work efficiency in checking the inventory of goods displayed in a shop, or in ordering goods to a wholesaler.

A microcomputer is built in this type of portable data input apparatus. The casing of this apparatus has such a shape as to allow holding with one hand. The outer surface of the casing is provided with a keyboard for inputting codes and amounts of goods, and a display for showing the key-input data. Also, the casing of the apparatus contains a memory, constituted by a RAM, etc., for storing the key-input data relating to the codes and amounts of goods.

When the inventory is checked with use of this portable data input apparatus, the casing of the apparatus is held by one hand, and data is successively key-input by the other hand. When a predetermined amount of data is stored in the memory, the portable data input apparatus is carried to the place where a data processing apparatus constituted by a host computer is installed, and the input apparatus is connected to the data processing apparatus. Thus, the data stored in the memory of the portable data input apparatus is input to the data processing apparatus.

In order to simplify the data input operation of the portable data input apparatus, there has been proposed a portable data input apparatus with a pen-scanner type bar code reader. With this apparatus, bar codes, put on display shelves, denoting the codes of goods are read by the bar code reader, thereby easily inputting the codes of goods.

In the above-described portable data input apparatuses, however, the capacity of the memory is limited. Thus, when the inventory of many goods is checked, it is necessary that, each time a predetermined amount of data has been stored in the memory, the portable data input apparatus be connected to the data processing apparatus and the data in the memory be transferred to the data processing apparatus. Thus, the work efficiency for inventory check is considerably decreased.

If the pen-scanner type bar code reader is connected to the portable data input apparatus, for example, by means of a connection cable, the bar code reader may hinder the carrying of the data input apparatus. Thus, the handling of the data input apparatus, as well as the maintenance thereof, is troublesome.

SUMMARY OF THE INVENTION

The present invention has been made in consideration of the above circumstances, and its object is to provide a portable data input/transmission apparatus having greatly improved work efficiency and operability.

According to one aspect of the invention, there is provided a portable data input/transmission apparatus comprising: a casing having an end portion, the size of which is determined such that the end portion can be held by one hand; a pen-scanner type bar code reader, attached to one end of the casing in the longitudinal direction, for reading a bar code and generating code data corresponding to the read bar code; a keyboard, attached near the other end of the casing in the longitudinal direction, for enabling at least numerical data to be input; a transmitting/receiving means, stored within the casing, for outputting wirelessly to an external data processing apparatus code data read by said bar code reader and at least numerical data input from the keyboard, and, if necessary, for receiving a response signal from the data processing apparatus; and an antenna formed of an electrically conductive material.

According to another aspect of the invention, there is provided a portable data input/transmission apparatus comprising: a casing having an end portion, the size of which is determined such that the end portion can be held by one hand; a pen-scanner type bar code reader, attached to one end of the casing in the longitudinal direction, for reading a bar code and generating code data corresponding to the read bar code; a keyboard, attached near the other end of the casing in the longitudinal direction, for enabling at least numerical data to be input; a transmitting/receiving means, stored within the casing, for outputting wirelessly to an external data processing apparatus code data read by said bar code reader and at least numerical data input from the keyboard; a pair of antenna-containing grooves forced in a pair of facing side surfaces extending in the longitudinal direction of the casing, such that the grooves extend in the longitudinal direction of the casing to said other end of the casing; an antenna freely inserted into and drawn from said antenna-containing grooves from said other end of the casing, said antenna being formed of a substantially U-shaped, electrically conductive elastic material and being fitted in the grooves by virtue of the elastic force of the antenna; a large-diameter portion, provided at one end of the antenna, for preventing the antenna from being removed and fallen; and a removal-preventing member provided in the antenna-containing grooves, which is closer to said other end of the casing in the longitudinal direction, said removal-preventing member being designed to be engaged with said large-diameter portion of the antenna.

With the portable data input/transmission apparatus of the present invention, the operator holds the casing by one hand and, in order to read bar codes, moves the pen-scanner type bar code reader attached to an end portion of the casing in a direction perpendicular to the bar codes put on goods, etc., while the bar code reader being put in contact with the bar codes. This process is the same as a conventional one. In the present invention, however, the read code data is wirelessly output to the external data processing apparatus through the transmitter/receiver. For example, when numerical data is input by means of number keys provided on the keyboard, the numerical data is transmitted to the data processing apparatus through the transmitter/receiver.

In the case where the distance between the portable data input/transmission apparatus and the data processing apparatus is small, and good transmission condition is ensured, data can be output to the data transmission apparatus without pulling out the U-shaped antenna from the casing. On the other hand, when the distance between the portable data input/transmission apparatus and the data processing apparatus is large, and good transmission condition is not ensured, the data is output to the data transmission apparatus, with the antenna pulled out of the casing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 5A and 5B are a front cross-sectional view and a side cross-sectional view showing the internal structure of the portable data input/transmission apparatus according to the embodiment;

FIG. 8A shows a structure of a radio message for data transmission; and

FIGS. 8B and 8C show structures of upper parity data and lower parity data.

DETAILED DESCRIPTION OF THE PREFERRED EMBODIMENTS

An embodiment of the present invention will now be described with reference to the accompanying drawings.

Figure 1A:
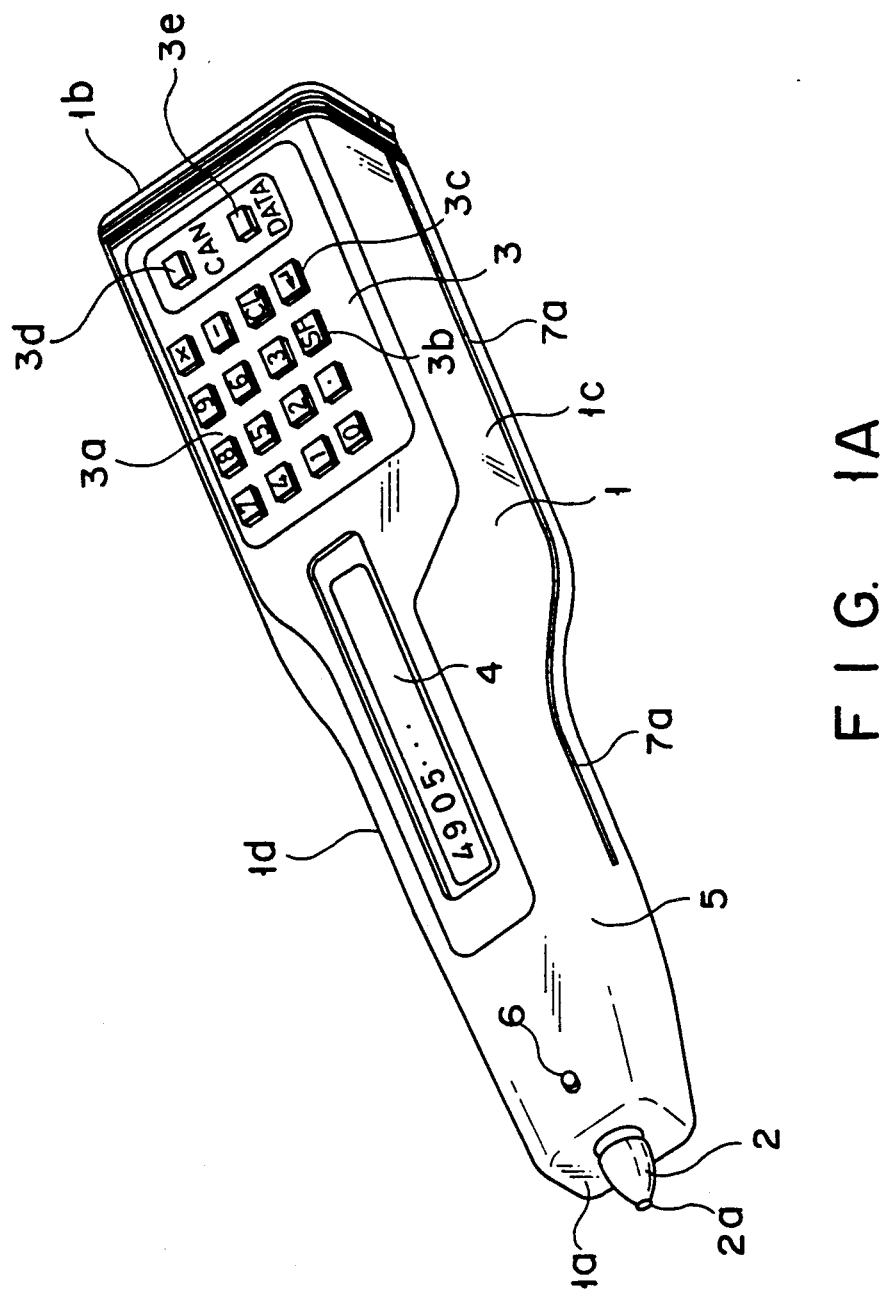
FIGS. 1A and 1B are perspective views showing a portable data input/transmission apparatus according to an embodiment of the present invention.
Figure 1B:
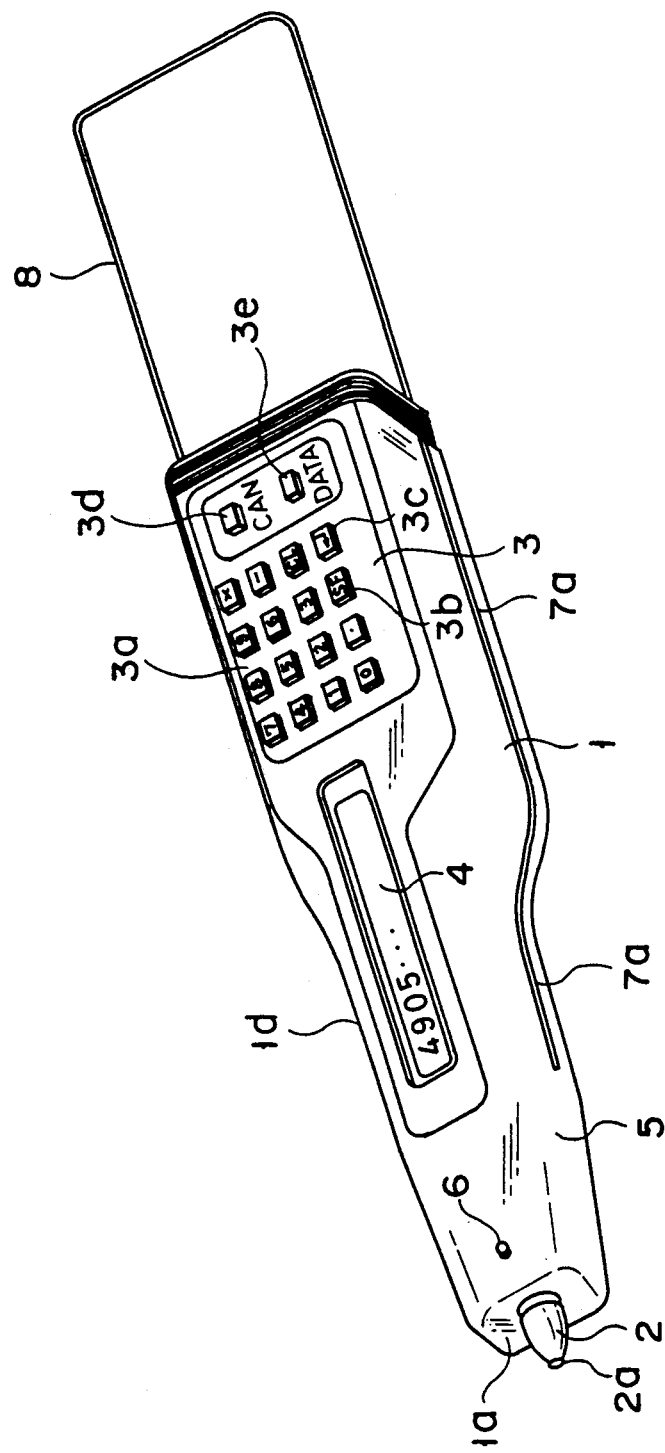
Figure 2A:
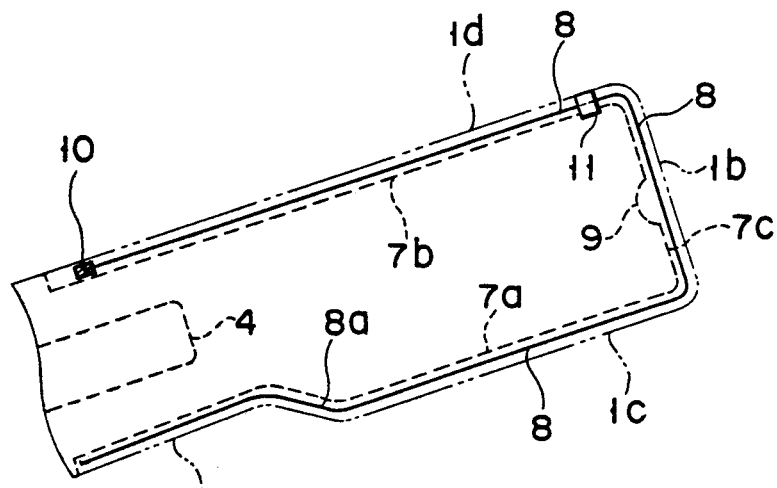
FIGS. 2A and 2B are cross-sectional views illustrating the attaching mode of an antenna.
Figure 2B:
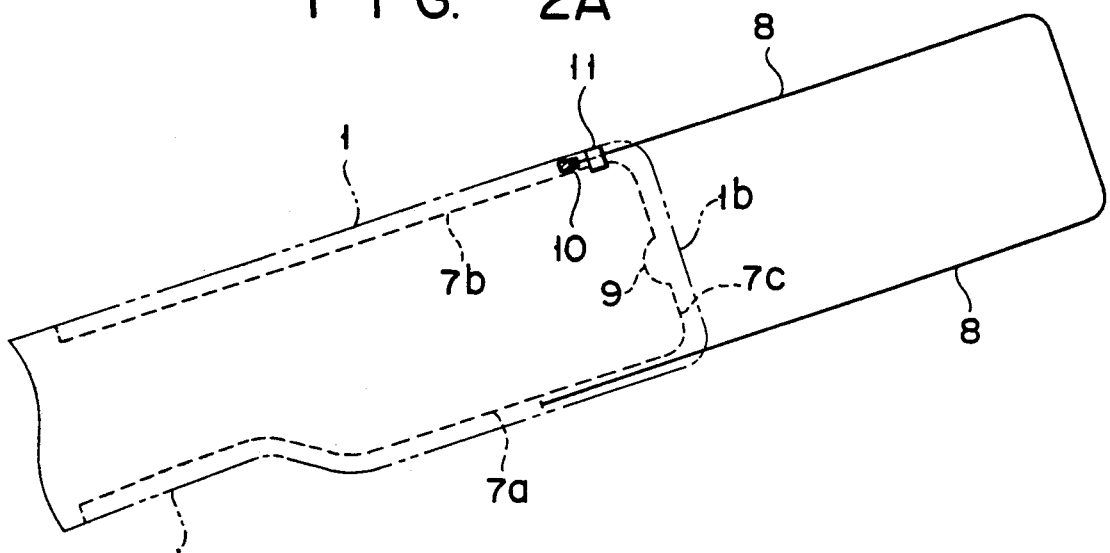

FIGS. 1A and 1B are perspective views showing a portable data input/transmission apparatus according to an embodiment of the present invention. In particular, FIG. 1A shows the state wherein an antenna is stored, and FIG. 1B shows the state wherein the antenna is pulled out. FIGS. 2A and 2B are cross-sectional views illustrating how the antenna is stored. In particular, FIG. 2A shows the state wherein the antenna is stored, and FIG. 2B shows the state wherein the antenna is pulled out.

A casing 1 is made of, for example, a plastic material. The casing 1 has a relatively small rectangular cross section, so that the casing 1 can be held with the thumb and index finger. A tip end face 1a (in the longitudinal direction) of the casing 1 is provided with a photosensor 2a of a pen-scanner type bar code reader 2, which is constituted by a light-emitting element (not shown) and a light-receiving element (not shown). A rear end face 1b of the casing 1 is provided with a keyboard 3 for key-inputting various data. A rectangular display 4 for displaying data in the form of dot pattern characters is mounted on a middle part (in the longitudinal direction) of the casing 1. The display face of the display 4 is formed from a liquid-crystal display panel. The front section of the casing 1, which extends from the display 4 to the bar code reader 2, is smaller in cross section than the other rear section of the casing 1, where the keyboard 3 is arranged. The front section serves as a handle 5. In the vicinity of the bar code reader 2, there is provided a lamp 6 for indicating that the bar code has been correctly read and the data has been correctly transmitted to an external data processing apparatus (not shown).

Figure 3:
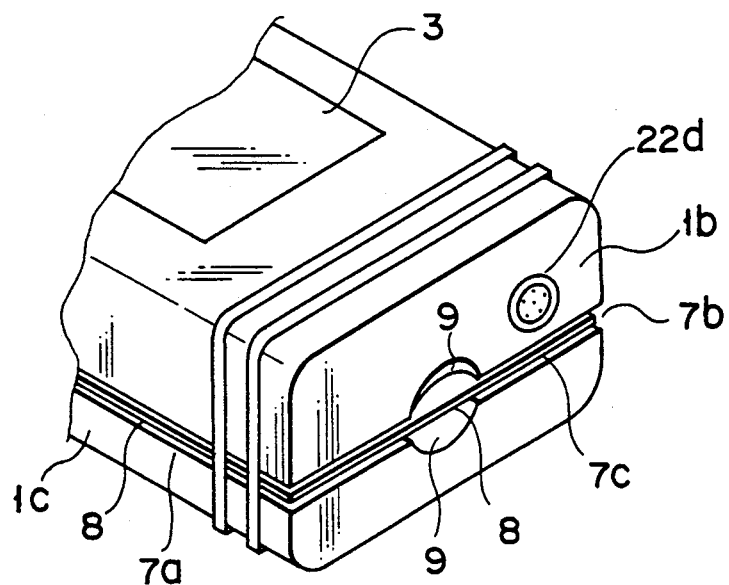
FIG. 3 is a perspective view showing a rear end face of the casing.

Antenna-containing grooves 7a and 7b are formed in the longitudinal direction in side faces 1c and 1d of the casing 1. An antenna-containing groove 7c communicating with the grooves 7a and 7b is cut in the rear end face 1b of the casing 1. As shown in FIG. 3, a recess 9 is formed in a central part of the rear end face 1b. The recess 9 enables the antenna 8 to be easily pulled out of the antenna-containing grooves 7a, 7b and 7c. If necessary, a socket 22d for connection with a cable is provided on the external data processing apparatus.

Figure 4:
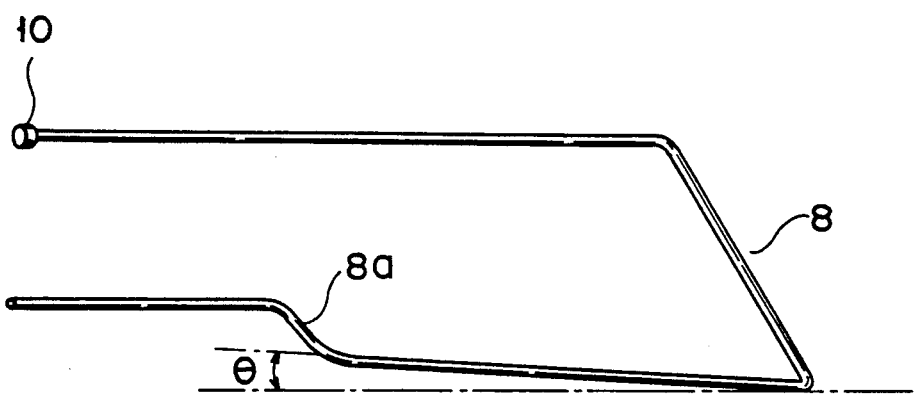
FIG. 4 is a plan view showing the antenna.

As shown in FIG. 4, the antenna 8 is formed of a copper wire with elasticity, and has a substantially U-shaped corresponding to the shape of the antenna-containing grooves 7a, 7b and 7c. In the state wherein the antenna 8 is separated from the grooves 7a, 7b and 7c, one side of the antenna 8 is bent inward by an angle $\theta$. By virtue of the bending of the one side of antenna 8, the antenna 8 is fitted on the bottom faces of grooves 7a and 7b, when the antenna 8 is inserted into the grooves 7a and 7b, as shown in FIGS. 2A and 2B. Even if the casing 1 is inclined, the antenna 8 is prevented from moving in the grooves 7a and 7b.

Since the antenna-containing groove 7c is formed in the rear end face 1b, the antenna 8 does not project from the grooves 7a, 7b and 7c. Also, since a curved portion 8a is provided in that part of the groove 7a, which is formed in the handle 5, the antenna is not displaced toward the rear end face 1b unless an external force is applied.

Figure 2C:
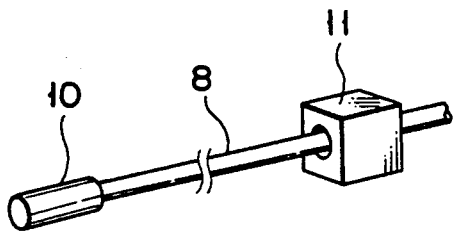
FIG. 2C is a perspective view showing an annular stopper.

As shown in FIGS. 2A, 2B and 2C, one end of the antenna 8 is provided with a large-diameter portion 10 for preventing removal of antenna 8. An annular stopper 11 made of an electrically conductive material, serving as a member for preventing the removal of antenna 8, is stationarily provided in that region of the groove 7b, which is close to the rear end face 1b. The antenna 8 slides in the annular stopper 11. Namely, the annular stopper 11 is always electrically connected with the antenna 8.

As shown in FIGS. 1B and 2B, when data is transmitted, the antenna 8 is pulled out from the rear end face 1b of the casing 1, on as-needed basis. In this case, since the large-diameter portion 10 abuts against the annular stopper 11, the antenna 8 is not removed from the rear end face 1b of the casing 1.

As shown in FIGS. 1A and 1B, the keyboard 3 is provided with number keys 3a for inputting numerical data, and various function keys. The function keys include a shift key 3b, a scroll key 3c for moving the display position of data displayed on the display 4, a cancel key 3d for canceling data stored in a data memory (not shown) in the memory section, a data transmission key 3e for transmitting the data stored in the memory section to the data processing apparatus, etc.

FIGS. 5A and 5B are a front cross-sectional view and a side cross-sectional view showing the internal structure of the portable data input/transmission apparatus. A binary circuit 2b and a code converter circuit 2c are arranged adjacent to the photosensor 2a of the bar code reader 2. The display 4 is arranged in the central part of the casing 1. A keyboard substrate 22a, on which key-operated switch elements are arranged, is disposed under the keyboard 3. Two printed circuit (PC) boards 22b and 22c and a transmitter/receiver 19 are provided under the keyboard substrate 22a. Electronic parts such as a central processing unit (CPU) are arranged on the PC boards 22b and 22c. The transmitter/receiver 19 is connected to the annular stopper 11 by means of an antenna wire 8a. A battery 21 for supplying power to electronic parts is disposed under the display 4. The PC boards 22a and 22b are connected to the sockets 22d, and are connected, where necessary, to the external data processing apparatus through a cable.

Figure 6:
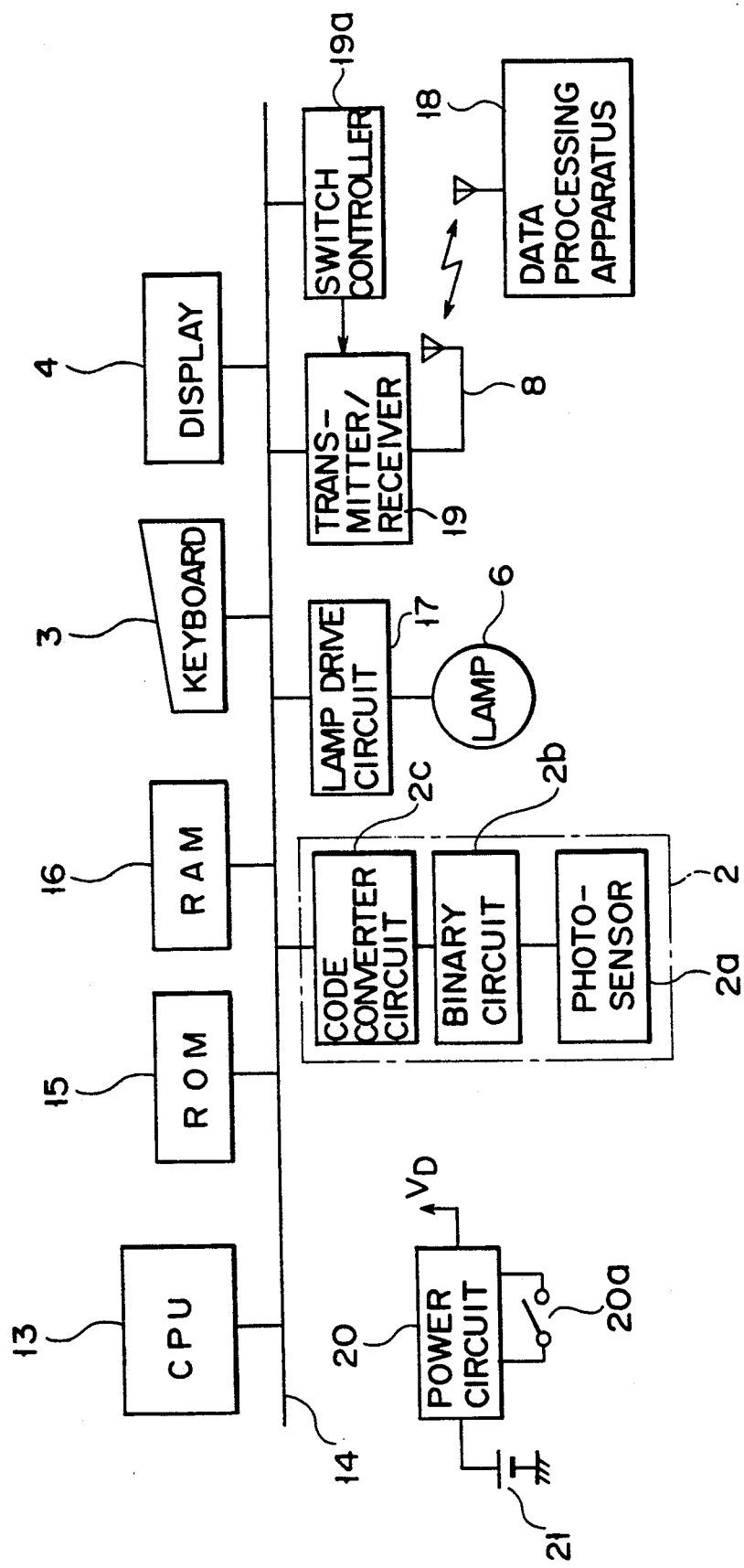
FIG. 6 is a block diagram illustrating the electrical structure of the portable data input/transmission apparatus according to the embodiment.

FIG. 6 is a block diagram illustrating the electrical structure of the portable data input/transmission apparatus. A CPU 13 is connected through a bus line 14 to a read only memory (ROM) 15 for storing fixed data such as control programs, a random access memory (RAM) 16 for storing variable data such as input various data, the aforementioned keyboard 3, the display 4, the bar code reader 2, a lamp drive circuit 17 for turning on the lamp 6, the transmitter/receiver 19 for wirelessly transmitting data to a transmitter/receiver built in a data processing apparatus 18 or the external apparatus and receiving response signals from the data processing apparatus 18, a switch controller 19a, etc. The transmitter/receiver 19 is connected through the annular stopper 11 to the antenna 8 stored in the antenna-containing grooves 7a to 7c of the casing 1.

The CPU 13 controls the switching of the receiving/transmitting modes of the transmitter/receiver 19 through the switch controller 19a. More specifically, in the normal state, the CPU 13 sets the transmitter/receiver 19 in the receiving mode through the switch controller 19a. When the data transmission key 3e on the keyboard 3 is operated and a transmission command is generated, the CPU 13 sets the transmitter/receiver 19 in the transmitting mode through the switch controller 19a. When the data transmission is completed, the CPU 13 immediately restores the transmitter/receiver 19 to the receiving mode through the switch controller 19a, and the transmitter/receiver 19 stands by for response signals from the data processing apparatus 18.

A drive DC voltage $V_D$ is supplied from the power circuit 20 to the electronic parts. The power circuit 20 is supplied with power from the battery 21.

Figure 7A:
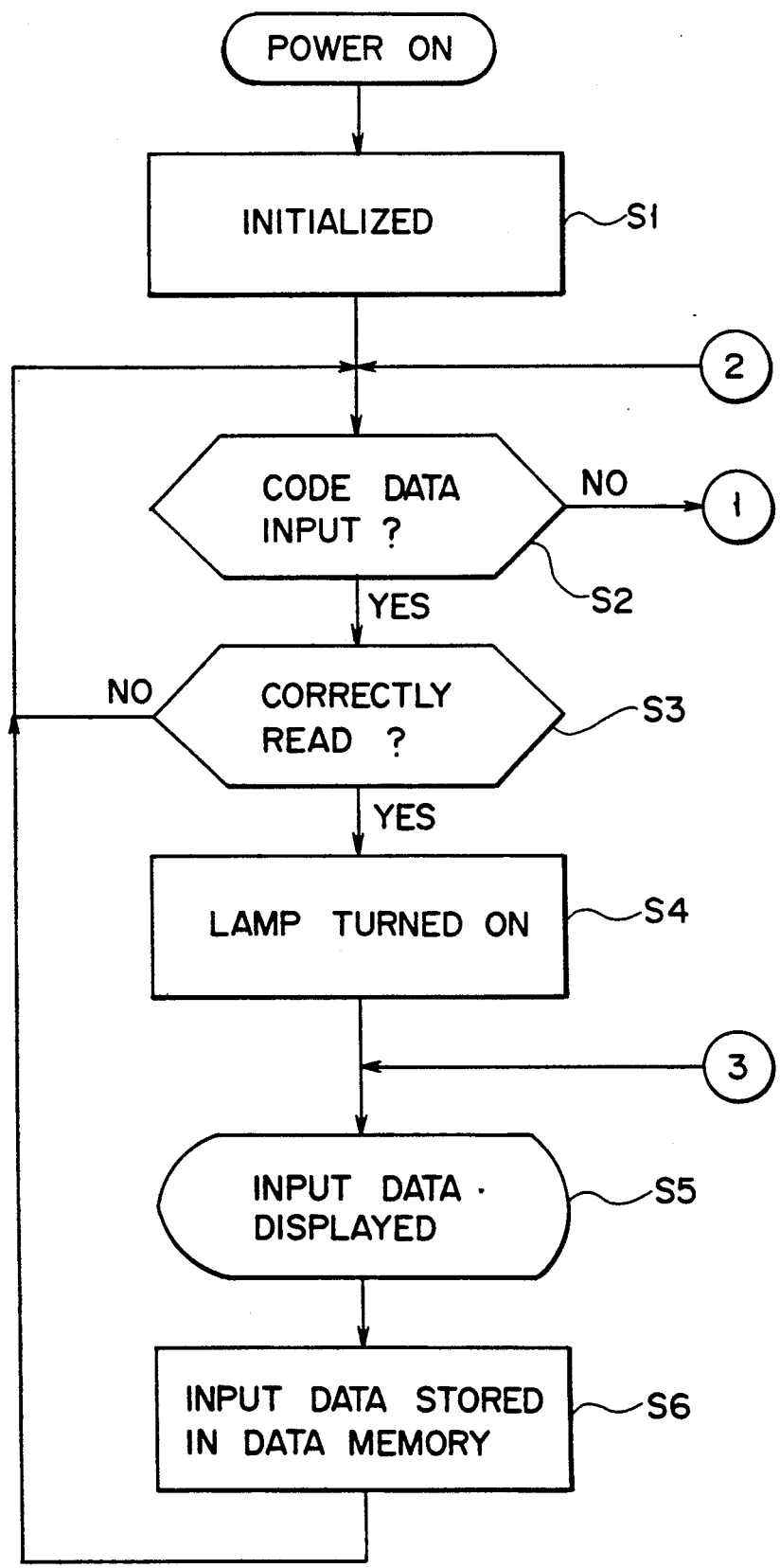
FIGS. 7A to 7C are flowcharts for explaining the operation of the portable data input/transmission apparatus according to the embodiment.
Figure 7B:
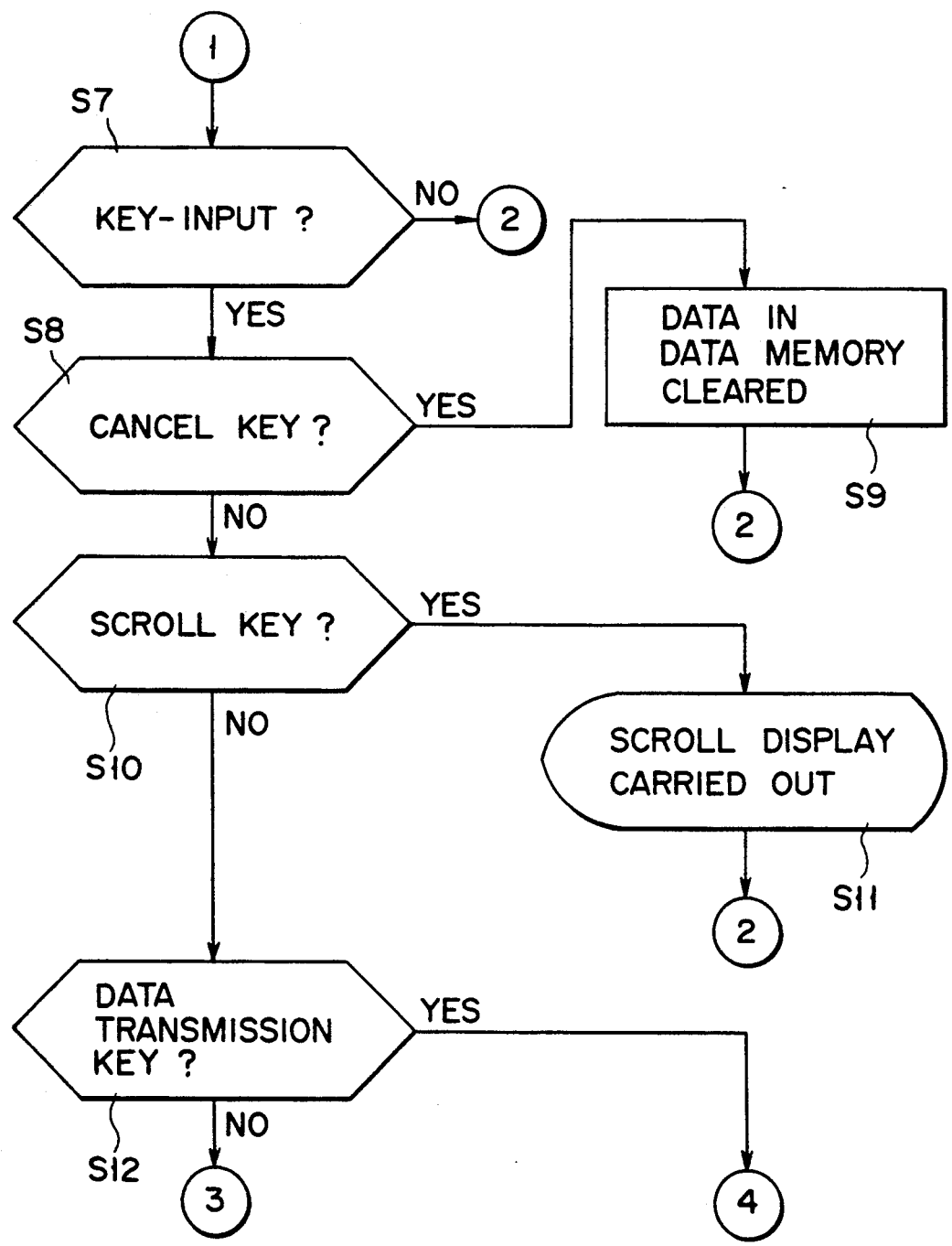
Figure 7C:
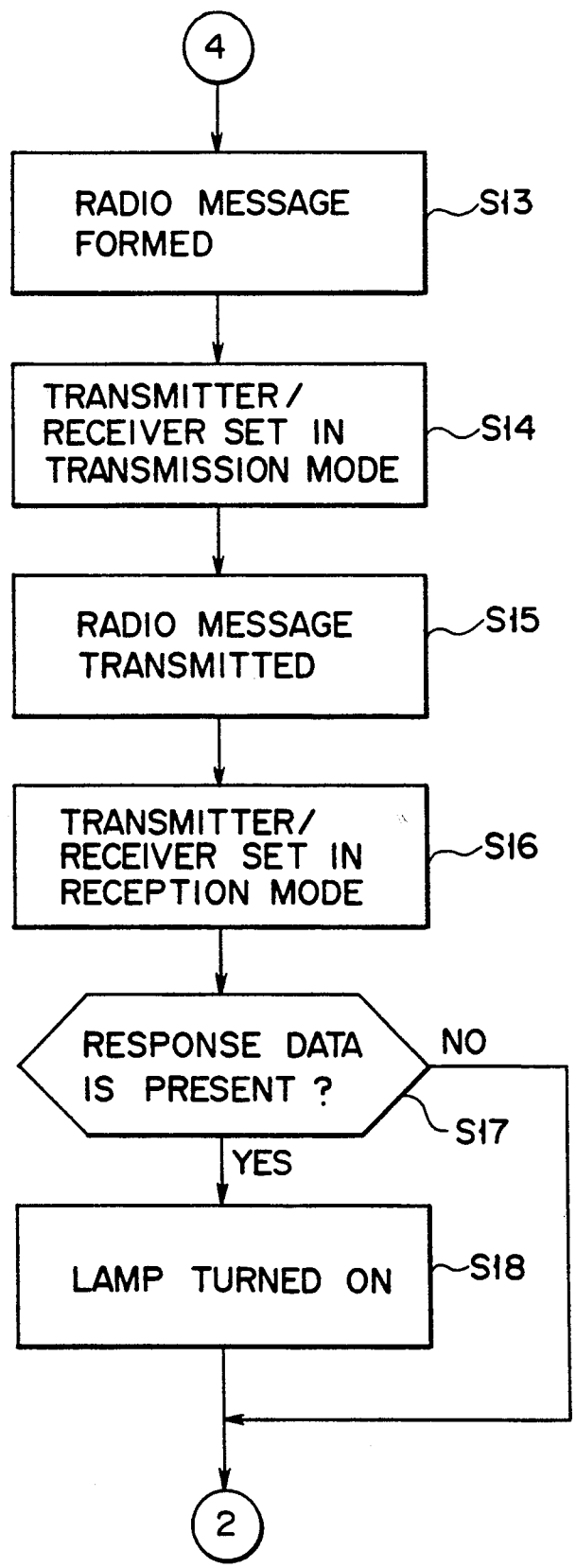

The operation of the above-described portable data input/transmission apparatus, when it is used in checking the inventory of goods displayed on shelves in a shop, will now be described with reference to the flowcharts of FIGS. 7A to 7C. It is supposed that bar codes for specifying goods are put on the display shelves.

First, a power switch 20a (FIG. 6) is turned on. When drive voltage $V_D$ is supplied to each electronic part, the CPU 13 initializes the apparatus in accordance with control programs stored in the ROM 15 (step S1). In the initializing step, for example, the operation of the electronic parts is checked, and the transmitter/receiver 19 is set to the reception mode by means of the switch controller 19a. Then, the CPU 13 stands by for input.

The operator grasps the handle 5 of casing 1 with one hand, and brings the photosensor 2a of bar code reader 2 into contact with bar codes on labels attached to the display shelves. In this state, the apparatus is moved in a direction perpendicular to the bars of the bar codes. Image data corresponding to the bar code read by the photosensor 2a of the pen-scanner type bar code reader 2 is normalized by the binary circuit 2b to a high-level (H) signal or a low-level (L) signal. The normalized image data is converted to product code data corresponding to the bar code read by the code converter circuit 2c. The product code data is supplied to the CPU 13.

Upon receiving the data, the CPU 13 determines whether or not the data is the product code data output from the bar code reader 2 (step S2). In the case of the product code data, the CPU 13 determines whether the read bar code has been correctly converted to the product code data (step S3). When the bar code has been converted correctly, the CPU 13 controls the lamp drive circuit 17 and turns on the lamp 6 for a short period of time, e.g. a second (step S4).

By virtue of the lamp 6, the operator can judge whether or not the bar code has been correctly read. If the lamp 6 is not turned on, the operator brings the photosensor 2a of bar code reader 2 into contact with the bar code once again, which has not been correctly read. In this state, the apparatus is moved in a direction perpendicular to the bars of the bar code to read the bar code.

After the lamp 6 has been turned on, the CPU 13 enables the display 4 to display the product code data (step S5), and stores the data in the data memory in the RAM 16 (step S6).

When it is found in step S2 that the input data is not the product code data, the CPU 13 determines whether the input data is the key-input data from the keyboard 3 (step S7). If it is the key-input data, the CPU 13 then determines whether the key-input data has been produced upon the operation of the cancel key 3d of keyboard 3 (step S8). If YES in step S8, the CPU 13 operates to clear the data stored in the data memory in RAM 16 (step S9).

If the key-input data is not produced upon the operation of the cancel key 3d, the CPU 13 then determines whether the key-input data has been produced upon the operation of the scroll key 3c of keyboard 3 (step S10). If YES in step S10, the CPU 13 operates to move the display position of data displayed on the display 4 (step S11).

If NO in step S10, the CPU 13 determines whether the key-input data has been produced upon the operation of the data transmission key 3e of keyboard 3 (step S12). If NO in step S12, the CPU 13 performs the operation in step S5. In other words, if the key-input data is not input upon the operation of the data transmission key 3e, the CPU 13 determines that the key-input data is the amount data representative of the amount of goods, which has been visually read by the operator and has been input by the other hand upon the operation of the number keys 3a of keyboard 3. The amount data is displayed on the display 4 (step S5), and is stored in the data memory in the RAM 16 (step S6).

If the data transmission key 3e of keyboard 3 is operated after even a single piece of inventory data (including product code data and amount data) has been stored in the data memory in RAM 16, this fact is detected in step S11. Thus, the CPU 13 combines the product code data and the amount data stored in the data memory of RAM 16, and produces a radio message 23 in the format shown in FIG. 8A (step S13). After the transmitter/receiver 19 is set in the reception mode by the switch controller 19a (step S14), the formed radio message is FSK-modulated and output wirelessly from the transmitter/receiver 19 through the antenna 8 (step S15).

As shown in FIG. 8A by way of example, the radio message 23 begins with a header, and start of text (STX) code follows the header. Fourteen data units D1 to D14 follow the STX code. An end of text (EXT) code, upper parity data 24, and lower parity code 25 are arranged after the data units D1 to D14. Finally, a carriage return (CR) code and a line feed (LF) code follow them. In this embodiment, data units D1 to D4 represent code data, and data units D5 to D8 represent amount data.

FIGS. 8B and 8C show the arrangements of the upper parity data 24 and lower parity data 25. Odd horizontal parity data [P1 to P8] of data units D1 to D14 is divided into upper 4-digit parity data [P5 to P8] and lower 4-digit parity data [P1 to P4]. Both 4-digit parity data are assigned to the lower four digits of the upper and lower parity data 24 and 25. Specific codes [S1 to S8] are divided into two groups and assigned to the upper four digits of the upper and lower parity data 24 and 25. As mentioned above, the odd horizontal parity data [P1 to P8] is divided and assigned to the upper and lower parity data 24 and 25. Thus, if the specific codes of the upper digits are set to values that do not coincide with the subsequent CR code, each 8-bit parity data is prevented from coinciding with the subsequent 8-bit CR code. If an error occurs in data units D1 to D14 while they are being transmitted, the data processing apparatus 18 surely detects it.

A data transmission system wherein data is parity-checked in the above manner is well known, from example, as disclosed in Published Unexamined Japanese Patent Application No. 63-257836. Therefore, a detailed description of this type of system may be omitted.

A wirelessly output radio message 23 is received by a transmitter/receiver of the data processing apparatus 18, and the data processing including parity checks is performed. If the data processing apparatus 18 normally receives the data message from the portable data input/transmission apparatus, it outputs a response signal wirelessly. In this situation, the transmitter/receiver 19 in the portable data input/transmission apparatus is set in the reception mode by the switch controller 19a upon the command from the CPU 13 (step S16). Once the CPU 13 receives the response signal (step S17), the lamp 6 is turned on by the lamp drive circuit 17 for a given short time period (step S18). Then, the apparatus is rendered ready for a subsequent reading operation for reading the product code (bar code) of the next goods.

If the lamp 6 is not turned on, the operator can judge that some error has occurred during data transmission. In this case, the data transmission key 3e of keyboard 3 is operated once again to retransmit radio message 23. Namely, since the radio message 23 can be retransmitted in case the data processing apparatus 18 does not normally receive it, the reliability of transmitted data units D1 to D14 can be increased.

As stated above, the data input to the portable data input/transmission apparatus can be wirelessly transmitted to the data processing apparatus 18 immediately upon the key operation of the data transmission key 3e. Thus, it is not necessary for the operator to move to the data processing apparatus each time a predetermined amount of data is stored in the memory section, in order to transfer the data to the data processing apparatus. Therefore, the efficiency of data input operation can be greatly enhanced.

When the distance between the display shelves on which goods are arranged and the data processing apparatus 18 is small and good wireless transmission between the portable data input/transmission apparatus and the data processing apparatus 18 is ensured, the bar codes are read and keys are operated in the state wherein the antenna 8 is stored in the antenna-containing grooves 7a, 7b and 7c formed in the outer face of the casing 1, as shown in FIGS. 1A and 2A. Thus, the antenna 8 does not hinder the data input operation and, compared to the case wherein a special exclusive antenna is connected to the apparatus, the operability of the apparatus can be remarkably enhanced.

When the distance between the display shelves and the data processing apparatus 18 is relatively large, and good wireless transmission between the portable data input/transmission apparatus and the data processing apparatus 18 is not expected, the bar codes are read and keys are operated in the state wherein the antenna 8 is pulled out from the rear face 1c of the casing 1, as shown in FIG. 1B or 2B.

In this manner, depending on the condition of wireless transmission, the antenna 8 is inserted into the grooves 7a to 7c or pulled out therefrom. Thus, data can always be transmitted to the data processing apparatus 18 with high efficiency. In addition, since the antenna 8 can be easily inserted or pulled out, the operability of the apparatus can be enhanced.

Moreover, by virtue of the large-diameter portion 10 and the annular stopper 11, the antenna 8 is prevented from falling from the rear end face 1c when it is pulled out.

As has been described above in detail, according to the portable data input/transmission apparatus of the present invention, a data wireless transmitter/receiver device is provided in the apparatus and a bar code reader is directly attached to the casing. Also, an antenna of the transmitter/receiver can be inserted into or pulled out from the antenna-containing grooves formed in both side faces of the casing. Thus, when good transmission is ensured, the antenna is stored in the grooves while data is input. The efficiency of the data input operation, therefore, can be enhanced. There is no need to provide a space for installation of the antenna. Furthermore, since the antenna can be easily inserted and pulled out, the operability of the apparatus can be increased.

Additional advantages and modifications will readily occur to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

What is claimed is:

1. A portable data input/transmission apparatus comprising:
   a casing having an end portion, the size of which is determined such that the end portion can be held by one hand;
   a pen-scanner type bar code reader, attached to one end of the casing in the longitudinal direction, for reading a bar code;

a keyboard, attached near the other end of the casing in the longitudinal direction, for enabling at least numerical data to be input;

a transmitting/receiving means, stored within the casing, for outputting wirelessly to an external data processing apparatus code data read by said bar code reader and at least numerical data input from the keyboard;

a pair of substantially linearly extending antenna-containing grooves formed in a pair of opposite side surfaces extending in the longitudinal direction of the casing, such that the grooves extend linearly in the longitudinal direction of the casing to and open through said other end of the casing; and a generally U-shaped antenna having legs in and slidable along said grooves in said longitudinal direction enabling linear longitudinal sliding movement of said antenna relative to said casing between an antenna stored position with said antenna legs lying substantially wholly within said grooves and a withdrawn operative position with only portions of said legs in said grooves and a base of the U-shaped antenna between said legs spaced longitudinally from said other end of said casing, said antenna being formed of electrically conductive elastic material.

2. The apparatus according to claim 1, wherein said transmitting/receiving means includes a transmitter/receiver for receiving response data output from said external data processing apparatus.

3. The apparatus according to claim 1 wherein at least one leg of said antenna is biased in said groove toward said casing to assert a clamping force on said casing.

4. A portable data input/transmission apparatus comprising:

a casing having an end portion, the size of which is determined such that the end portion can be held by one hand;

a pen-scanner type bar code reader, attached to one end of the casing in the longitudinal direction, for reading a bar code;

a keyboard, attached near the other end of the casing in the longitudinal direction, for enabling at least numerical data to be input;

a transmitting/receiving means, stored within the casing, for outputting wirelessly to an external data processing apparatus code data read by said bar code reader and at least numerical data input from the keyboard;

a pair of antenna-containing grooves formed in a pair of facing side surfaces extending in the longitudinal direction of the casing, such that the grooves extend in the longitudinal direction of the casing to said other end of the casing;

an antenna freely inserted into and drawn from said antenna-containing grooves from said other end of the casing, said antenna being formed of a substantially U-shaped, electrically conductive elastic material and being fitted in the grooves by virtue of the elastic force of the antenna;

said transmitting/receiving means including a transmitter/receive for receiving response data output from said external data processing apparatus;

a large-diameter portion, provided at one end of the antenna, for preventing the antenna from being removed; and a removal-preventing member provided in one of the antenna-containing grooves, which is closer to said other end of the casing in the longitudinal direction, said removal-preventing member being designed to be engaged with said large-diameter portion of the antenna.

5. The apparatus according to claim 4 wherein at least one leg of said antenna is biased in said groove toward said casing to assert a clamping force on said casing.

6. The apparatus according to claim 4, wherein said removal-preventing member comprises an annular stopper through which only that part of the antenna, which is other than the large-diameter portion, can pass.

7. The apparatus according to claim 6, wherein said annular stopper is formed of an electrically conductive material connected to said transmitter/receiver, and wherein said antenna is passed through the annular stopper, such that the antenna is constantly put in contact with annular stopper.

* * * * *